June 25, 1968  R. L. TREINEN ETAL  3,390,270
DEVICE FOR SENSING THERMAL NEUTRONS AND UTILIZING SUCH
NEUTRONS FOR PRODUCING AN ELECTRICAL SIGNAL
Filed Oct. 22, 1965

INVENTORS.
Robert L. Treinen
BY Raymond H. Stentz

ATTORNEY.

United States Patent Office 3,390,270
Patented June 25, 1968

3,390,270
DEVICE FOR SENSING THERMAL NEUTRONS AND UTILIZING SUCH NEUTRONS FOR PRODUCING AN ELECTRICAL SIGNAL
Robert L. Treinen, Forest Park, and Raymond H. Stentz, Mount Healthy, Ohio, assignors to the United States of America as represented by the United States Atomic Energy Commission
Filed Oct. 22, 1965, Ser. No. 502,698
6 Claims. (Cl. 250—83.1)

ABSTRACT OF THE DISCLOSURE

This invention relates to a thermal-neutron sensor which has the capability of providing a dynamic linear response to changes in thermal-neutron-flux conditions while providing an electrical output indicative of the density of the thermal-neutron flux at the sensor. The senor is formed of an emitter electrode possessing a high thermal-neutron absorption across section for radiative capture of thermal neutrons and a collector electrode separated from the emitter electrode by a dielectric material. An $(n,\gamma)$ reaction occurs in the emitter electrode upon sensing thermal neutrons for the generation of gamma photons which are absorbed to generate Compton electrons for collection by the collector electrode.

---

The invention described herein was made in the course of, or under, a contract with the U.S. Atomic Energy Commission. This invention relates generally to the detection of neutrons, and more particularly to unpowered sensing devices capable of detecting thermal neutrons and utilizing such neutrons for producing electrical outputs corresponding to the thermal-neutron flux present at the devices.

Thermal-neutron intensity in a nuclear reactor is a valuable measure of the power level of the reactor. Thus, a thermal-neutron sensor capable of responding linearly and instantaneously to changes in thermal-neutron flux, and capable of providing a stable electrical output for a steady state thermal-neutron flux condition would prove to be a valuable instrument for monitoring and controlling nuclear reactors.

The present invention aims to achieve the above and other desirable features by providing a thermal-neutron sensor which is capable of demonstrating a dynamic linear response to changes in thermal-neutron flux while producing an electrical output in response to the detection of thermal neutrons that is indicative of the density of the thermal-neutron flux present at the sensor.

An object of the present invention is to provide an improved neutron sensor which does not require the application of auxiliary electrical power for its operation.

Another object of the present invention is to provide a thermal-neutron sensor which is capable of rapid linear response to changes in thermal-neutron flux, and capable of providing a stable electrical output in response to steady state thermal-neutron flux conditions.

Another object of the present invention is to provide a neutron sensor capable of providing an electrical output essentially entirely due to the presence of thermal neutrons.

A further object of the present invention is to provide electrical signals corresponding to thermal-neutron flux density by utilizing Compton scattering principles.

A still further object of the present invention is to provide thermal-neutron sensors with materials capable of converting thermal neutrons to an electrical output.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

While the thermal-neutron sensing devices of the present invention are described primarily for use in nuclear reactors, it is to be understood that devices constructed in accordance with the teachings of the present invention may be utilized to sense neutrons in other environments, e.g., neutron sources, accelerators, etc. If desired, suitable moderators in these other environments may be utilized to provide neutron energy levels corresponding to those of thermal neutrons. Also, for convenience of discussion the term "thermal neutron" as used herein is intended to include neutrons other than thermal neutrons that have energy levels generally similar to the latter.

Generally, a neutron sensor constructed in accordance with the teachings of the present invention may comprise an emitter electrode separated from a collector electrode by a dielectric material. The emitter electrode is made of or coated with a material possessing a high thermal-neutron absorption cross section for radiative capture such as, for example, cadmium-113. Thermal-neutron capture occuring in the isotope cadmium-113 causes an $(n, \gamma)$ reaction resulting in the formation of stable cadmium-114. The excitation energy of this reaction is carried off by a gamma-ray spectrum that is emitted simultaneously with the formation of cadmium-114. About four gamma photons are promptly emitted from the cadmium for each thermal-neutron radiative capture by the cadmium.

The gamma photons produced in the cadmium emitter having energies between about 0.3 to about 3 mev. will interact with materials of low atomic number principally by Compton scattering to provide Compton electrons. Thus, with the dielectric material intermediate the electrodes being of a material having a low atomic number, the gamma photons from the emitter will collide with atoms in the dielectric and generate Compton electrons which move along with the gamma photons and are collected by the collector electrode to provide a direct current output which may be coupled to a suitable control or metering instrument for display and recording.

Figure 1:
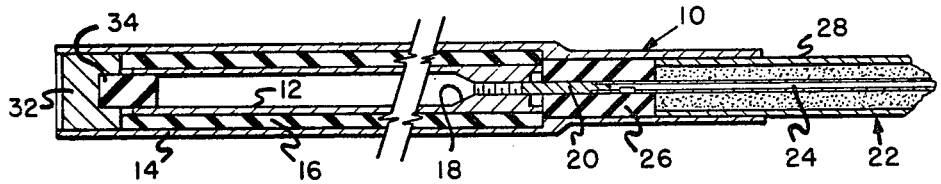
FIG. 1 is a sectional plan view showing one form of an unpowered thermal-neutron sensor of the present invention.

Now referring more particularly to FIG. 1, there is a neutron sensor 10 of the present invention which is shown comprising a pair of laterally spaced apart concentric tubulations or cylinders with the inner cylinder defining an emitter electrode 12 and the outer cylinder defining a collector electrode 14. These electrodes are electrically isolated from one another by an annular insulator 16 of a suitable dielectric material.

The inner emitter electrode 12 may be formed of or coated with any suitable material possessing a high thermal-neutron capture cross section. For example, the emitter electrode 12 may comprise a nickel cylinder coated or plated on outer surfaces thereof with cadmium-113 of about 0.0025 of a centimeter (cm.) in thickness. Or, if desired, the emitter electrode may be a cylinder of gadolinium machined or otherwise formed with a wall thickness of about 0.041 cm. Gadolinium-155 or gadolinium-157 both possess very high thermal-neutron absorption cross sections and undergo $(n, \gamma)$ reactions similar to cadmium to provide about four gamma photons for each thermal-neutron radiative capture. Other materials which may be utilized as emitter electrode material include samarium-149 and mercury-199 which respectively have average yields of about 5.6 and about 3.3 gamma photons per thermal-neutron capture.

The collector electrode 14 is preferably of a material having a substantially lower thermal-neutron absorption cross section than the emitter electrode material so that thermal-neutron capture by the collector electrode is minimal for minimizing a counter-flow of Compton electrons. Collector electrode materials having satisfactory thermal-neutron absorption cross sections and suitable fabrication properties include stainless steel, nickel, titanium, aluminum, magnesium, and the like.

Compton electron production may be more significant in high atomic number material, but pair production is also more frequent and causes the absorption of gamma photons. Consequently, as mentioned above, the dielectric material is preferably of low atomic number so that a substantial number of Compton electrons resulting from capture gamma rays interacting with the dielectric material will be "picked up" by the collector electrode. Materials of low atomic number exhibiting satisfactory dielectric properties that may be used as the insulator 16 include alumina, beryllium oxide, magnesium oxide, and the like.

The sensor 10 may be constructed by providing the inner electrode with a thickened end portion 18 having a passageway or bore therein. This passageway may be tapped for threadedly receiving a solid rod 20 of conducting material to provide a suitable terminal for the attachment of a suitable electrical lead. For example, a coaxial cable 22 may provide the electrical leads from both sensor electrodes to suitable control or instrumentation and recording devices (not shown). The coaxial cable 22, which may be provided with any suitable dielectric, such as, for example, magnesium oxide or the like, may have the inner conductor 24 thereof coupled to the conducting rod 20 in any suitable manner. The length of the rod 20 and the length of inner conductor 24 projecting beyond the ends of the emitter electrode 12 and the coaxial cable dielectric, respectively, may be encircled by a sleeve 26 of suitable electrical insulating material to electrically isolate the inner conductor 24 from the outer conductor or shield 28 of the coaxial cable 22.

In order to couple the collector electrode 14 to the coaxial cable the insulator 16, which may be a solid form of any of the above-mentioned dielectric materials, may be disposed about the full length of the emitter electrode 12 in a contacting relationship therewith. The insulator 16 may then, in turn, be encased within the collector electrode 14 which may be in the form of a closely fitting shell of any suitable material as pointed out above. The shell forming the collector electrode is preferably of a sufficient length as to project over the sleeve 26 and an end portion of the outer conductor 28 of the coaxial cable for facilitating attachment to the latter in any suitable manner, e.g., soldering and the like.

The sensor assembly described above may be sealed off at a pressure of about $10^{-6}$ millimeters of mercury following evacuation and outgassing, for minimizing ionization effects. A suitable arrangement for sealing off the open end of the emitter electrode may comprise a solid metal plug 32 which may be soldered or otherwise secured to an end portion of the collector electrode 14 overlapping the insulator 16 and the underlying emitter electrode 12. A dielectric slug 34 carried in a suitable aperture in the plug 32 may project into the emitter electrode to support and facilitate closing the latter. The metal plug 32 may be electrically isolated from the emitter electrode 12 by terminating the latter short of the end of the insulator 16 as shown, or by providing a slight spacing between the electrode and the plug if the electrode is coextensive with the insulator 16.

The assembled sensor 10 may be of any suitable dimensions, such as, for example, the sensor may have an outside diameter of about 0.953 cm., an over-all sensitive length of about 7.62 cm., and a sensitive area of about 11 cm.$^2$. Evaluations using cadmium and gadolinium sensors of these dimensions are set forth below to point out features of the present invention.

Figure 2:
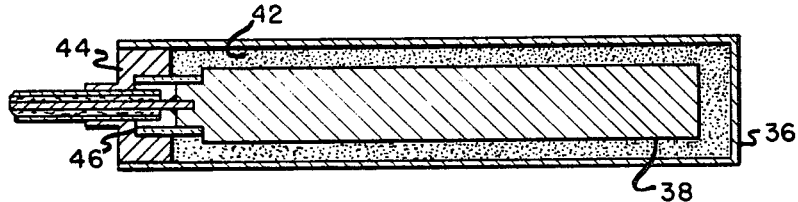
FIG. 2 is a sectional plan view showing another form of the present invention.

While the emitter electrode 12 of sensor 10 is shown as being a hollow cylinder, it may be preferred to use an emitter electrode having a solid cross section of the high neutron absorption cross section material, as shown in FIG. 2, for substantially increasing the operational lifetime of the sensor as will be discussed in greater detail below.

In FIG. 2 another form of thermal-neutron sensor is shown. This sensor functions essentially similar to the FIG. 1 device and is shown comprising a container-like collector electrode 36 housing a solid rod-like emitter electrode 38 which may be formed of, for example, cadmium-113 or of any other suitable material as pointed out above.

One end of the emitter electrode may be provided with an aperture to receive the inner conductor of a coaxial cable which may be similar to the coaxial cable of the FIG. 1 sensor. If desired, the aperture in the electrode may be tapped to receive a conducting rod as in the FIG. 1 form for facilitating the coupling of the electrode to the coaxial cable. The insulator 42 in this sensor configuration may be in the form of powdered dielectric material such as, for example, powdered alumina or any of the other dielectric materials described above. The dielectric powder as shown is disposed about the side walls and the end wall of the emitter electrode 38 to enhance the over-all Compton electron generation.

A tubular insert 44 of a suitable metal may be used to electrically couple the collector electrode 36 to the outer conductor or shield of the coaxial cable. The insert 44 may be secured to the coaxial cable and electrode 36 in any suitable manner, e.g., soldering, brazing, or the like. A dielectric sleeve 46 may be positioned between the electrode 38 and the insert 44 to electrically isolate the electrical paths of the electrodes and aid in retaining the powdered dielectric within the container-like collector electrode.

A sensor such as shown in FIG. 2 may have an outside diameter of about 2.54 cm., an emitter electrode diameter of about 1.4 cm., a sensing length of about 12.7 cm., and an emitter electrode sensitive area of about 57 cm.$^2$.

Figure 3:
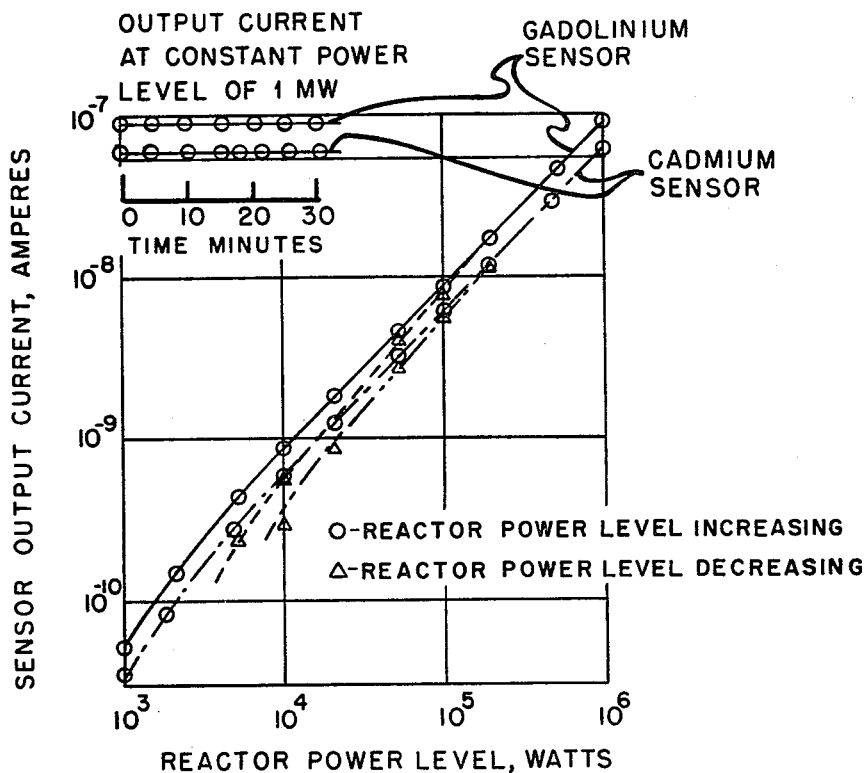
FIG. 3 is a plot showing current outputs of cadmium and gadolinium thermal-neutron sensors at various reactor power levels.

FIG. 3 illustrates the linear dynamic response and the current output for cadmium and gadolinium sensors of the FIGS. 1 and 2 type over a thermal-neutron flux range of about $1 \times 10^{10}$ to about $1 \times 10^{13}$ $n/(cm.^2 sec.)$. At least two decades of linear response are obtained from each sensor during increasing reactor power level conditions. An average thermal-neutron sensitivity of about $5.5 \times 10^{-21}$ amperes/$n/(cm.^2 sec.)$ is obtained with the cadmium emitter sensors and about $9.5 \times 10^{-21}$ amperes/$n/(cm.^2 sec.)$ with the gadolinium sensors. Both sensors exhibit a positive polarity of thermal-neutron-induced output current since the Compton electron flow is outward to the collector electrode.

High residual gamma-ray background, resulting from reactor operation at full power, limits the linear response of both sensors to about one decade for a decreasing reactor power level condition. However, while gamma radiation may be detected by the sensors of the present invention, the resulting current output as a function of such gamma radiation is only about one percent of the total output current produced by the sensor. Polarity of the gamma-induced output currents for the sensors is negative since the net flow of secondary electrons is from the collector electrode to the emitter electrode. An average gamma sensitivity for the cadmium sensor is about $7 \times 10^{-17}$ amperes/R.-hr., while the gadolinium sensor exhibits about $1.6 \times 10^{-17}$ amperes/R.-hr. These gamma sensitivities were determined by gamma irradiation of a dose rate of $6.9 \times 10^5$ R./hr. from a cobalt-60 source.

The stable output currents obtained from cadmium and gadolinium sensors at a steady-state reactor power level of one megawatt are illustrated in FIG. 3. There was no indication during the testing periods to indicate deterioration of output current stability. The sensors instantaneously responded to the changes of thermal-neutron flux initiated by the reactor control servo system operating around a set-point to maintain reactor power level at 1 megawatt. Also, the Compton electrons are generated with a sufficiently high energy and consequently are not influenced by small potentials normally existing in the sensor circuitry.

Relatively long operating lifetimes can be anticipated for the sensors despite the rather large thermal-neutron absorption cross sections of cadmium and gadolinium. A $4.8 \times 10^{-3}$ cm. thickness of cadmium emitter may absorb about 99 percent of the thermal-neutron flux incident at the sensor. To appreciably deplete the cadmium-113 isotope from this thickness would require an approximate irradiation period of 25 days at a thermal-neutron flux of $1 \times 10^{14}$ n./(cm.$^2$ sec.). A gadolinium emitter thickness of $3.3 \times 10^{-3}$ cm. may also absorb about 99 percent of the incident thermal-neutron flux. However, the gadolinium-155 and gadolinium-157 isotopes may be depleted after approximately 3.5 days in a thermal-neutron flux of $1 \times 10^{14}$ n/(cm.$^2$ sec.). As a thickness of the neutron-sensitive material becomes depleted of cadmium-113, gadolinium-155, or gadolinium-157 additional layers become available for further thermal-neutron radiative capture. Attenuation of the emitted capture-gamma-rays by the depleted layers of cadmium-113, gadolinium-155, and gadolinium-157 is not significant, and consequently would not adversely affect sensor thermal-neutron sensitivity. Of course, if the emitter electrodes are solid the operating liftimes of the sensors will be substantially greater than the lifetimes noted above for the thin cadmium and gadolinium emitters.

It will be seen that the present invention sets forth thermal-neutron sensors capable of direct conversion from thermal neutrons to electrical currents, i.e., an instantaneous and stable electrical signal is generated as a function of thermal-neutron flux without the application of external power.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

What is claimed is:

1. An unpowered sensor for detecting thermal neutrons and generating an electrical output signal corresponding to thermal-neutron density, comprising an emitter electrode including a material having a high thermal-neutron absorption cross section for emitting gamma photons upon capture of thermal neutrons, dielectric material disposed in close contiguity to said electrode for interacting with the gamma photons to generate Compton electrons, and a collector electrode of a material having a substantially lower thermal-neutron absorption cross section than said emitter electrode and separated from the latter by said dielectric for intercepting said electrons to produce said output signal.

2. A sensor as claimed in claim 1, wherein said emitter electrode comprises a material selected from the group consisting of cadmium, gadolinium, samarium, and mercury.

3. A sensor as claimed in claim 1, wherein said emitter electrode has an elongate configuration, the collector electrode encircles the emitter electrode and is laterally spaced therefrom, and wherein the dielectric material is disposed in contiguous relationship with and in the space between said electrodes.

4. A sensor as claimed in claim 3, wherein said collector electrode comprises a cylinder concentrically disposed about the emitter electrode, the dielectric material is in the configuration of a tubulation at least coextensive with the emitter electrode, and wherein a coaxial cable is electrically coupled to said electrodes adjacent one end thereof for conveying said electrical output signal.

5. A sensor as claimed in claim 4, wherein the collector electrode encloses the end of the emitter electrode remote to the coaxial cable, the emitter electrode is axially spaced from the closed end of the collector electrode, and wherein the tubulation of dielectric material is in powder form and fills the space between the closed collector electrode end and the emitter electrode.

6. An electrical signal producing device of the character described comprising emitter means for absorbing neutrons and emitting about 3 to about 5.5 gamma photons for each neutron absorbed, dielectric means of a material having a low atomic number disposed in close adjacency to said emitter means for producing Compton electrons when the gamma photons collide with atoms of said emitter means, and collector means separated from said emitter means by the dielectric means for collecting said electrons to provide said signal.

References Cited

UNITED STATES PATENTS

| | | | |
|---|---|---|---|
| 3,067,329 | 12/1962 | Linden | 250—83.1 |
| 3,101,410 | 8/1963 | Ruby et al. | 250—83.1 |

ARCHIE R. BORCHELT, *Primary Examiner.*